Dec. 20, 1955  J. HERTRICH  2,727,629
CONTINUOUS CENTRIFUGAL FILTERS AND METHOD
Filed Feb. 21, 1949  4 Sheets-Sheet 1

INVENTOR.
JOSEPH HERTRICH
BY
ATTORNEYS

Dec. 20, 1955  J. HERTRICH  2,727,629
CONTINUOUS CENTRIFUGAL FILTERS AND METHOD
Filed Feb. 21, 1949  4 Sheets-Sheet 2
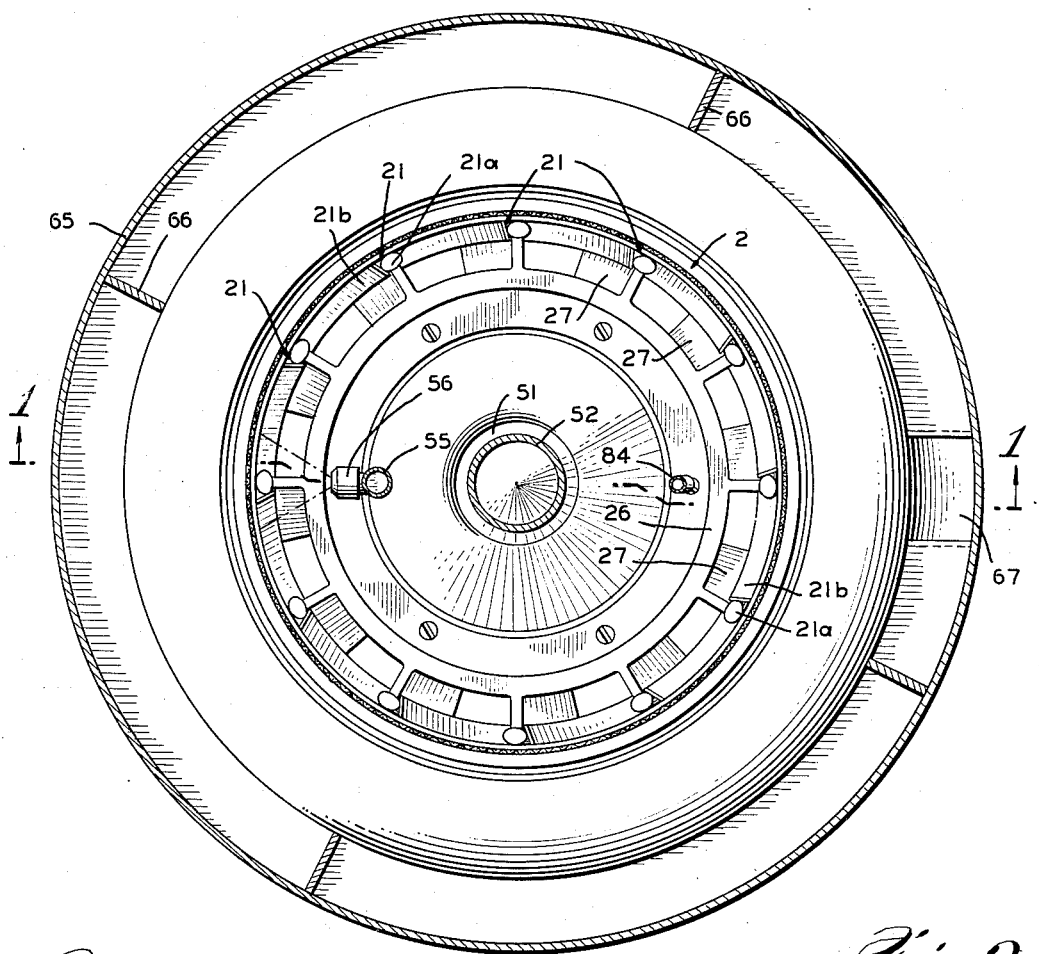
Fig.3  Fig.2
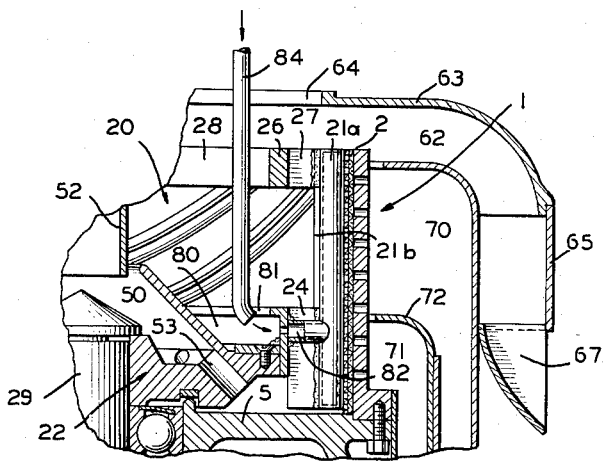
INVENTOR.
JOSEPH HERTRICH
BY
ATTORNEYS Dec. 20, 1955     J. HERTRICH     2,727,629
CONTINUOUS CENTRIFUGAL FILTERS AND METHOD
Filed Feb. 21, 1949     4 Sheets-Sheet 3
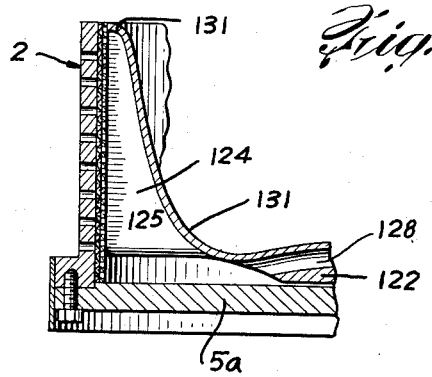
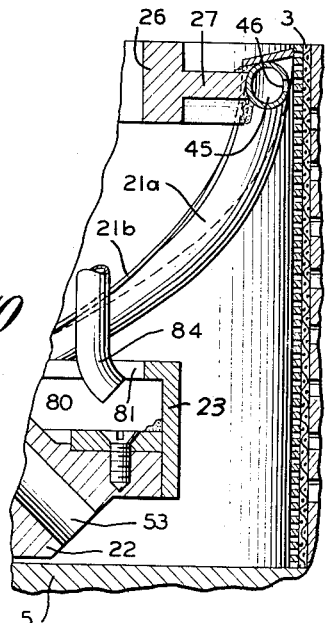
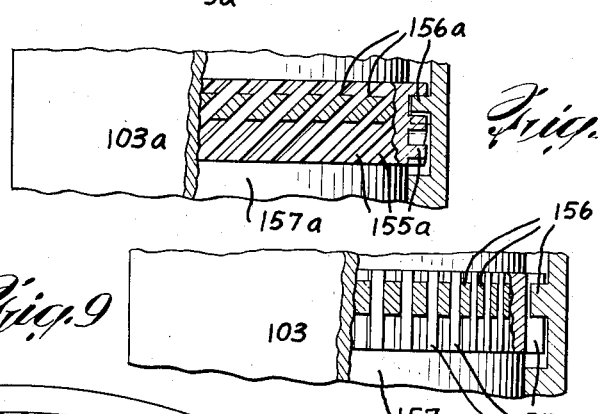
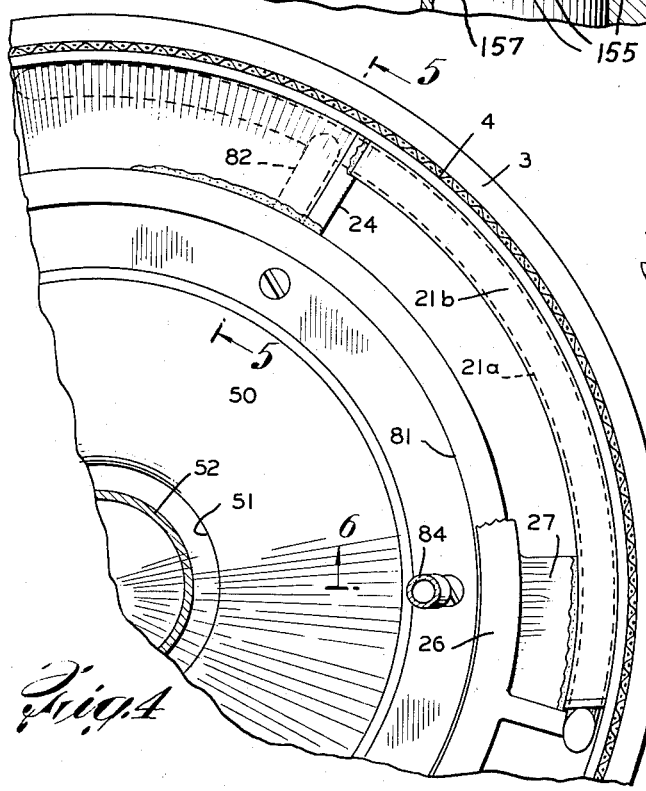
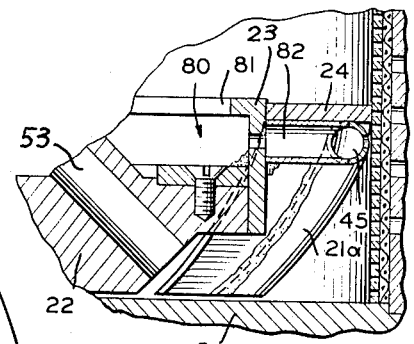
INVENTOR.
JOSEPH HERTRICH
BY
ATTORNEYS

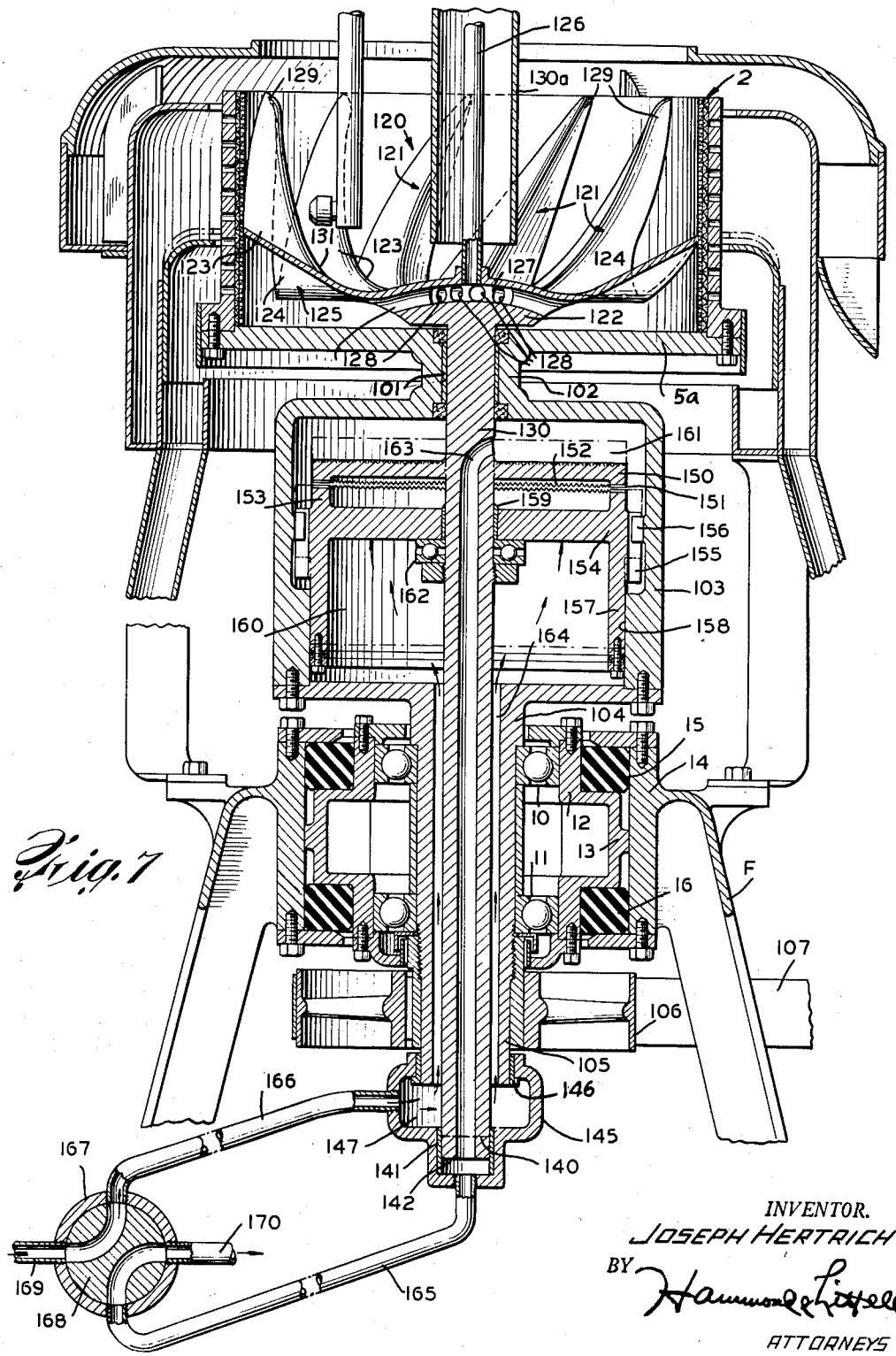

United States Patent Office 2,727,629
Patented Dec. 20, 1955

2,727,629

CONTINUOUS CENTRIFUGAL FILTERS AND METHOD

Joseph Hertrich, Hamilton, Ohio, assignor to The Western States Machine Company, Hamilton, Ohio, a corporation of Utah Application February 21, 1949, Serial No. 77,578

8 Claims. (Cl. 210—67)

This invention relates to new and improved continuous centrifugal machines of the type utilizing a relatively movable rotary feed member in a continuously rotated foraminous basket for moving solids through the basket while liquid is being separated from them by centrifugal force.

A general object of this invention is to provide continuously operative centrifugal machines which are more efficient and more versatile than known machines of that type.

A more particular object is to provide machines suitable for continuously separating liquid and solid components of materials, such as sugar or dextrose massecuites or magmas, which have not been amenable to commercially successful treatment in known continuous centrifugal machines, as well as for the more effective processing of materials for which the latter have been used with some success.

A further object of the invention is to provide new structures, combinations and methods which improve the convenience, the operation and the processing efficiency of continuous centrifugal machines of the type mentioned.

More particular objects of the invention are:

To provide for increased efficiency of movement of solids along a continuously rotating annular basket wall through the action of a relatively movable rotary feed member;

To provide rotary feed member constructions useful in varied forms within a cylindrical or a conical basket, for thrusting any solids held in the rotating basket through it at a regular rate, or for retarding motion of solids to a suitable regulated rate in a basket so tapered that the solids normally pass through of their own accord under centrifugal force;

To provide for the efficient washing of solids moving along the side wall of the rotating basket under the influence of the rotary feed member;

To provide for washing the foramina of the basket side wall in the course of continuous centrifugal operations, without having to interrupt the operations or to dissolve solids in the basket in order to clean it;

To provide improved arrangements of structures for driving the basket and feed member;

To provide for efficient separate collection of the solids and liquids discharged continuously in the operation of such machine; and To provide relatively simple, rugged and compact organizations of all the essential elements of such a continuous centrifugal machine, and one which renders the basket or parts associated with it readily accessible for observation, adjustment, cleaning or replacement.

Still another object of this invention is to provide combinations making use of novel structures having characteristics above mentioned together with modified embodiments of the invention disclosed in my copending application Serial No. 517,309 filed January 7, 1944, now United States Patent No. 2,462,098.

According to this invention, a centrifugal basket arranged for continuous rotation at high speed and having an annular foraminous side wall which may be cylindrical or frusto-conical, as desired, is provided with a coaxial rotary feed member that is movable relative to the rotating basket and has a multiplicity of coaxial arms spaced circularly about the inner face of the basket wall and extending along it between its ends to a solids outlet at one end, so that continuous rotation of the basket and relative movement of the fed member cause the arms to traverse the whole foraminous area of the side wall and cause any solids present on it to be moved forward along it until they reach and pass from the output. Each arm is formed to present a longitudinal surface spanning the length of the foraminous area and engaging solids on it at a slope or angle to its generating lines, such that appropriate movements of the sloped surfaces relative to the rotating basket must result in forward movements of any solids present.

The arms themselves may be carried rotatably as a unit by spokes of a common axial supporting wheel or spider within the basket. The wheel preferably is located adjacent the backward or closed end of the basket where fresh charge material may be continuously introduced ahead of the wheel, and it preferably has a shaft extending behind that end in coaxial relation with the basket shaft to rotary driving mechanisms by which the required continuous rotation and relative movement are brought about through the two shafts.

An organization of this nature, in contrast to known continuous centrifugals of the type first mentioned, gives positively controlled feeding of any solids present through the full length of the basket while keeping the outlet end and the interior of the basket open and largely unobstructed by the feed member. Thus the contents of the operating machine can be easily observed by an attendant, and simple stationary facilities can be employed for charging the basket, for washing material spinning in it, or for performing other process functions desired in the centrifugal operations.

In addition, the fact that the feed member arms traverse the whole foraminous area makes it possible to utilize them for washing all the basket foramina continuously, periodically, or at any time desired, without interrupting the operations or adversely affecting the contents of the machine. This is of great importance to the successful continuous centrifuging of materials which contain minute soluble particles or sticky substances that easily obstruct the small filtration openings or screens of the basket wall. The desired basket washing function may be provided readily according to this invention by making the length of the arms hollow, connecting them radially with a common chamber for a suitable washing fluid, which chamber conveniently forms a part of their supporting wheel, and forming them with outlets opening to the adjacent inner face of the basket wall for delivering the washing fluid directly thereto.

The arms of the feed member may be formed with their respective longitudinal axes as well as their longitudinal surfaces extending at an angle to the generating lines of the basket wall, in which case the arms constitute circularly spaced helical elements and the feed member may act as a multiple-vane screw. In any case the longitudinal axes of the arms extend at a wide angle to any plane perpendicular to the axis of the basket wall (i. e., at a wide helic angle), one much greater than that of the winding threads of feed screws used in known continuous centrifugal machines. For many purposes this angle preferably is an acute angle of at least 20 degrees yet not exceeding 45 degrees, but forms can be used to advantage, especially for cylindrical baskets, wherein the longitudinal axes lie at an acute angle exceeding 45° to such a plane or even may be perpendicular thereto. In forms of the latter type the arms are made with longitudinal surfaces sloped radially outward from their bases to the open end of the basket wall and efficient feeding of solids is obtained by operating the feed member more as a reciprocatory pusher than as a rotary screw.

According to some embodiments hereof the feed member is made with a multiplicity of spaced helical arms extending between the ends of the basket wall at an acute helic angle of the smaller order above mentioned not exceeding 45 degrees, and the required continuous and controlled feeding of solids is obtained through continuous differential rotation of the feed member relative to the basket. Adequate strength and support for arms of this character may be assured by providing an interconnecting ring spaced inward from their ends at the open end of the basket, in addition to a wheel carrying them at the backward end; the ring being connected to the arm ends by radial spokes to permit free movement of solids from the basket, and yet being open centrally over a large area so that the interior of the basket assembly is kept readily accessible.

According to other embodiments, the arms may extend at a larger helic angle, say of the order of 60 degrees, with their solids-engaging surfaces sloped radially outward from relatively deep and wide roots on a supporting wheel at the backward end of the basket to free ends of little depth and width at the open end of the basket. Here the arms resemble sloping fingers or wedges projecting freely from a common hub. The movement of solids by such arms may be maintained efficiently by alternately thrusting the feed member axially forward relative to the basket, so as to displace solids longitudinally toward its open end, and then pulling the feed member axially backward while its arms turn in unscrewing relation to the basket charge according to a modified embodiment of the invention of the aforesaid copending application.

When solids are to be washed in the rotating basket, the presence of corners or pockets along sides of the feed member arms should be avoided in order that the washing fluid may be assured of reaching all parts of the advancing charge. It has been found that this can be accomplished by making the arms with sides sloping laterally towards the adjacent basket wall at an angle to the radii of the respective arms.

Furthermore, from considerations involving the angle of repose of the spinning solids, it has been found that irregularities of washing may be obviated by making the arms shallow where they extend through the washing zone, i. e. making them with little radial depth as can be done readily according to the construction here disclosed, and charging the basket at a rate such that the advancing body of solids completely covers the arms in that zone so as to present an uninterrupted surface for reception of the washing fluid. Movement of the charge along the basket thus takes place by relative movement of the shallow arms within and beneath the surface of a covering body of solids, which not only involves an advantage in washing efficiency but also assists in mainatining a desirable linear or sliding motion along the basket, as distinguished from rolling motion, of granular solids lying in spaces between the arms of the feed member.

In embodiments hereof using baskets of a cylindrical or slightly conical shape, through which the solids do not move of their own accord under the centrifugal force applied, the relative movement of the feed member serves to push any solids present positively through the basket at a regular rate which depends in any particular circumstances upon the rate of relatve movement. On the other hand, the basket used may be so widely tapered that the solids introduced would normally slide through it under the centrifugal force applied, in which case a differentially rotated feed member of the nature here disclosed may be employed as a retarding screw so as to limit longitudinal movement of the solids to a desired regular rate controlled by the relative rotation of the feed member. In case of a feed member that pushes solids forward by differential rotation, the feed member should be rotated faster than the basket in order to secure best washing effects from use of a stationary spray nozzle; while in the case of a solids-retarding feed member in a conical basket the basket should be rotated faster to obtain like effects.

The basket assembly and driving mechanisms of the machine here disclosed may be mounted either horizontally or vertically. Any suitable mounting may be employed, though it should provide a resilient bearing support for the basket and feed member shafts to permit gyratory movements of the whole rotary assembly.

Other objects, features and advantages of this invention will be apparent from the following detailed description and the accompanying drawings of illustrative embodiments thereof, while the features of invention disclosed will be defined particularly in the claims.

In the drawings:

Fig. 2 is a horizontal cross section approximately along line 2—2 of Fig. 1, showing the basket and feed member in plan;

Fig. 3 is a fragmentary vertical section through a part of the basket, feed member and casing assemblies, wherein one of the helical arms is shown developed to a straight vertical position in order to illustrate details of its construction;

Fig. 4 is a plan view partly in horizontal section, with some parts removed, showing the complete span of one of the helical arms in the assembly of Fig. 1;

Figure 1:
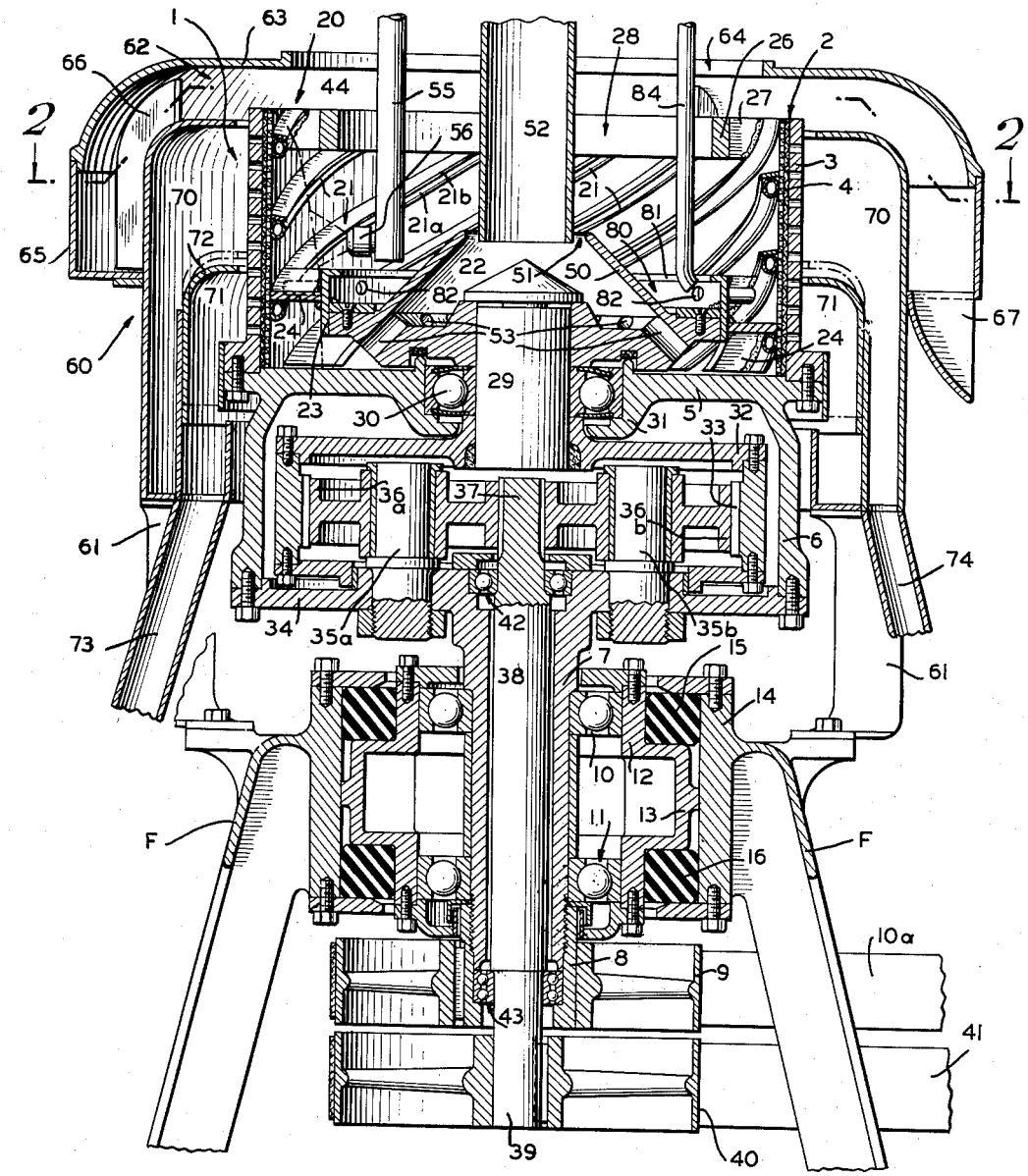
Fig. 1 is a vertical section through a continuous centrifugal machine constructed according to one embodiment of the invention, as viewed approximately along line 1—1 of Fig. 2.

Figs. 5 and 6 are fragmentary vertical sections taken approximately along lines 5—5 and 6—6, respectively, of Fig. 4;

Fig. 7 is a vertical section through a machine constructed according to a second embodiment of this invention;

Fig. 8 is a fragmentary vertical sectional diagram of a part of the basket with one of the feed member arms of Fig. 7 developed to a straight vertical position;

Fig. 9 is a fragmentary view of slidable ring gears used in the feed member drive of Fig. 7, the gears being shown partly in transverse vertical section and partly with the inner gear teeth in elevation and the outer gear teeth in circular section; and Fig. 10 is a similar view of an alternative form of slidable helical ring gears.

According to the embodiment illustrated in Figs. 1 to 6, a centrifugal basket 1 having a cylindrical foraminous side wall 2 is arranged vertically with its top end open and its bottom end 5 closed to receive material for centrifugal treatments. The basket has a hollow shaft assembly 6, 7 extending from its closed end, through which it is mounted and rotated continuously at a suitable high speed. A rotary feed member 20 works inside the basket under continuous differential rotation imparted through a central shaft 29 from mechanism connected with the basket shaft. The mechanism may take any of a variety of forms, of which one is shown and described in detail below.

All the rotary elements of the basket and feed member assembly are held in position by bearings on hollow shaft 7, which in turn are held in a resiliently mounted carriage on supporting framework F, as seen at 10 to 16 in Fig. 1.

Surrounding the basket is a stationary casing assembly 60 providing a large central opening 64 above, and an annular solids receptacle 62 around the open end of the basket, as well as separate annular compartments 70 and 71 around side wall 2 for collecting liquids spun from the basket. The casing assembly is shown supported on the framework F by brackets 61.

More particularly, the basket side wall 2 is made in usual manner of a perforated outer supporting shell 3 and a suitable filtration lining 4, of one or more layers, that permits liquid to pass through the wall while the solids to be treated are held against it by centrifugal force. Extending axially from the closed end 5 is a hollow driving member 6 connected to a quill shaft 7 that carries a driving pulley 9 on its lower end. Pulley 9 may be driven continuously by a belt 10a or otherwise. Shaft 7 is supported by upper and lower ball bearing sets 10 and 11 in an annular carriage 12 which in turn is held resiliently in a rigid housing 14 forming part of framework F. An external annular portion 13 of carriage 12 engages the inside of housing 14, and on opposite sides of this portion are annular recesses holding compressible buffer rings 15 and 16 between carriage 12 and housing 14. It will be evident that the basket 1 and its hollow driving member thus are mounted resiliently so that they may undergo limited gyratory movement under the influence of unbalancing loads.

The rotary feed member 20, as seen in Figs. 1 and 2, comprises a large number of coaxial helical arms 21 disposed in circularly spaced relation about the inside of wall 2. Each arm extends helically along this wall from its backward to its open end—in this example, at an acute angle of the order of 30° to any plane perpendicular to the axis of the basket and feed member rotation. The several arms are carried collectively by a wheel 22 located near basket end wall 5, the wheel having a hub portion 23 from which spaced helical spokes 24 extend radially to support the respective arms. The ends of the arms at the open top of the basket are further interconnected as a unit through a common rotary ring 26 which, like wheel 22, has spaced helical spoke connections at 27 to the respective arms. The various spokes dispose ring 26 and wheel hub 23 far enough inwardly from basket wall 2 to permit free movement of solids along this wall to the basket outlet, yet ring 26 still provides a large central opening 28 for ready access to the interior of the basket and screw assembly.

The feed member shaft 29 extends from wheel 22 to a position inside hollow basket driving member 6, passing through a radial bearing set 30 held in an axial hub 31 on end wall 5. Inside member 6 a planetary gear mechanism 32—37 interconnects shaft 29 with member 6, as follows, so that the feed member is rotated continuously with the basket but at a faster speed that can be regulated readily to suit different process requirements:

Driving member 6 surrounds a rotary annular housing 32 which is joined to member 29 and carries an internal ring gear 33. Member 6 has a circular wall or spider 34 on hollow shaft 7, from which oppositely disposed eccentric driving pins 35a and 35b project into housing 32. Idler gears 36a and 36b, respectively, are fixed for rotation on these pins. Outer portions of the respective idler gears mesh with the internal ring gear 33 on housing 32, while the adjacent inner portions of the respective idler gears mesh with a common pinion 37 located on the axis of the driving members. Pinion 37 is carried on an axial pinion shaft 38 that extends through and beyond the end of hollow shaft 7 to a lower end 39 where suitable pinion rotating means, for example a pulley 40 driven by belt 41, may be attached thereto. The pinion shaft 38 is held rotatably inside hollow shaft 7 by upper and lower ball bearing sets 42 and 43 located in recesses of the hollow shaft. The showing of belt drives at 9 and 40 is merely illustrative, it being understood that various other forms of driving gear may be employed.

Upon rotation of the hollow shaft 7 and member 6 to spin the connected basket 1 at the desired speed, the pins 35a and 35b carried by wall 34 produce similar rotation of the idler gears 36a and 36b bodily about the axis of the machine. Since the idler gears are confined between the ring gear 33 and their common pinion 37, the ring gear, housing 32, shaft 29 and the feed member 20 must rotate as the basket 1 is rotated, though at a relative speed which depends upon the gear ratios employed and the speed (if any) imparted to pinion 37.

As seen in Fig. 2 the feed member here illustrated has twelve distinct arms spaced equally around the inner face of the basket side wall, which may be, for example, about 24 inches in diameter in this case. The basket may be made larger in diameter and associated with a larger number of the helical fingers for similar charge-feeding effects. The basket as shown has relatively a small length of, for example, about 12 inches, which gives it a throughput capacity at least as large as that of a batch-type centrifugal basket of like diameter and twice as much depth. Each of the helical arms spans the full length of the foraminous area, describing much less than a full coil or 360° turn in so doing as seen in Figs. 1 and 5, and each arm traverses the whole foraminous area upon one full rotation of the feed member relative to the basket.

The arms 21 as shown are made of helically bent pipe section 21a having similarly bent blades or strips 21b rigidly secured thereto, by welding or otherwise, along the leading sides of the pipes so as to slope laterally toward the adjacent basket side wall. The leading surfaces of these blades form solids-engaging surfaces for the respective arms which in directions transverse to their length, i. e., laterally, are sloped to that wall at an angle to its radii passing through the arms, as is evident from the end view in Figs. 2 and 4. A blade 21b extends between the spokes 24 and 27 of each arm through a zone of the basket length wherein solids in the basket may be washed by fluid applied from a stationary spray nozzle 56 held on a wash fluid pipe 55. In that zone and elsewhere the pipe sections 21a and the blades 21b are so shallow, i. e., they occupy such a little depth radially from the adjacent basket side wall, that they may actually lie within and be covered by the solids which they feed through the spinning basket. In use the basket preferably is loaded at a rate sufficient to keep the arms covered at least through the washing zone.

The pipe sections 21a, furthermore, provide internal channels 45 therealong having outlet perforations 46 next to the adjacent basket side wall for applying directly to its foramina a washing fluid delivered into the arms as described below.

The continuously rotating basket 1 may be loaded continuously as follows: A wall 50 on wheel 22 defines a central rotary chamber which is open at 51, and a stationary loading tube 52 extends through the open end of the basket into this chamber for introducing the charge material. From chamber 50 a plurality of passageways 53 lead radially to the closed end of the basket. Accordingly, upon being introduced through tube 52 the charge material passes outward through the passageways 53 and is accelerated to a high speed approaching the basket speed. Then it is carried on side wall 2 and engaged by the leading sides of the differentially rotating arms 21, which push the solids present forward along the basket while free liquid contained in the charge is being driven off through the basket foramina by the centrifugal force of the basket rotation.

The advancing body of solids on wall 2 retains an annular shape of which the inner surface extending through the sprayer zone is practically uninterrupted, as indicated diagrammatically by dot-dash line 44 in Fig. 1. All the solids passing through the machine therefore may be washed efficiently, if desired, by applying a washing fluid continuously to a suitable band of this surface through the stationary pipe 55 and nozzle 56 fixed at a suitable location. The duration of washing can be regulated by changing the breadth of the spray or the rate of movement of solids by the feed member (i. e., its relative movement).

As the spinning charge moves through the washing zone, the wash liquid there produced is thrown off by centrifugal force into casing compartment 70, the free liquid content of the incoming charge material meanwhile being purged into the lower casing compartment 71. Ahead of the washing zone centrifugal force continues to be applied to the advancing solids over a length of travel sufficient for drying them to a desired degree, and then the feed member discharges them through the open end of the basket into the surrounding solids receptacle 62. This receptacle may be emptied regularly through an outlet spout 67 by means of radial scrapers 66 carried on a rotatable casing wall 63.

The separate liquid compartments 70 and 71 are divided by an adjustable annular partition 72 which makes possible any desired division of the extracted liquids for these compartments.

In order to keep the basket foramina clean, which is often indispensable to efficient centrifugal operation, a suitable washing fluid, such as hot water or steam, may be delivered at intervals, or even continuously if desired, into the fluid channels 45 of the feed member arms by feeding the fluid through a stationary pipe 84 or otherwise into a rotary receptacle 80 on wheel 22. This receptacle has an open top 81 around the charging chamber 50 and radial passageways 82 which lead into the pipe sections 21a of the respective arms as seen in Figs. 3 and 6. The fluid thus passes into and along all the arms and thence through their outlets 46 directly to the inner face of the basket lining. The whole foraminous area of the basket is easily kept clean in this way, and without having to interrupt the operation of the machine.

The operation of the machine of Figs. 1 to 6 may be summarized as follows:

Power is applied to shaft 7 so as to rotate the basket 1 continuously at the speed desired for centrifuging the charge material. At the same time pinion 37 may be rotated at a selected speed that gives the desired rate of solids movement through differential rotation of the feed member 20. The basket and feed member rotation are both counterclockwise as viewed from above, and the feed member is rotated the faster so that the leading sides of the helical arms at 21b must advance any solids present in the basket to its open end.

The charge material, for example, a sugar massecuite, is loaded continuously into the basket through tube 52 at a rate adapted to give the desired period of centrifugal treatment, depending upon the relative movement of the feed member, and so as to keep the helical arms covered by solids, at least in the spraying zone. The incoming charge material passes through chamber 50 and passageways 53 to the closed end of the basket. The solids are held inside and advanced along the side wall 2 with a surface outline approximately as indicated at 44, while the free liquid content of the material is purged through the foramina of wall 2 and collected in casing compartment 71. The helical arms rotate within and beneath the surface of the body of solids.

Meanwhile, a suitable washing fluid is sprayed continuously from nozzle 56 to an intermediate portion of this surface, where the solids arrive sufficiently rid of free liquid purged off in the zone below. The wash liquid thus produced is spun through the basket foramina into the upper liquid compartment 70. At the same time, either continuously or at suitable intervals, a washing fluid such as steam or hot water is fed from pipe 84 into receptacle 80 and thence through channels 45 of the individual helical arms, from which this fluid passes through the perforations 46 directly to the foramina of the basket side wall so as to clean obstructing deposits from them. The washed solids in the basket undergo drying action in travelling from the washing zone to the open end of the basket, and then they are discharged into receptacle 62.

For simplicity, the second illustrative embodiment of Fig. 7 is shown as being similar to the embodiment above described in respect to the basket construction, the casing assembly and the mounting of the rotary elements on a supporting framework below the basket and casing. It differs, however, mainly in the particular form of its feed member and in the manner of moving this member relative to the basket.

The feed member arms 121 in Fig. 8 are supported only by the rotary wheel 122 which forms a common root for them adjacent to the closed end wall 5a of the basket. Each arm extends between the closed and the open ends of the basket, and next to the inside of its foraminous wall 2, with the longitudinal axis of the arm at a large helic angle, say of the order of 60 degrees, to a plane perpendicular to the axis of basket and screw rotation. These arms are constructed as wedge-like channel elements, each having a wide and radially deep root at wheel 122 and having sides 123 and 124 which are divergently inclined to the adjacent basket side wall, which slope radially outward to its open end and which form a longitudinal channel 125 open along its outer face to the basket foramina. The arms are entirely free of attachments from their roots to their small ends 129 at the open end of the basket.

A washing fluid for cleaning the basket foramina may be introduced through pipe 126 into a receptacle 127 on wheel 122, from which the fluid is carried through radial passageways 128 into the respective channels 125.

The material to be processed may be charged into the basket through a stationary tube 130a opening to the face of wheel 122, whence the incoming material passes between the spaced inwardly sloping ridges 131 of the arms and undergoes acceleration by them in reaching the charge held on the inner face of the basket side wall 2.

The whole feed member comprising the arms 121 and wheel 122 is carried on an axial driving shaft 130, through which it may be reciprocated axially relative to the basket and caused to rotate relative thereto only during the backward strokes of reciprocation, according to the invention of said copending United States Patent No. 2,462,098. For this purpose driving mechanisms substantially as follows may be employed:

The basket driving member as here shown includes a sleeve 102 extending from basket end wall 5a and an enlarged chamber portion 103 from which a hollow shaft 104 passes through a resilient bearing mounting, which may be like that described above, to a lower end 105 where a driving pulley 106 is affixed for rotation by belt 107 from a suitable prime mover.

The feed member shaft 130 extends from wheel 122 at the closed end of the basket axially through a bushing 101 in hub 102 and thence through chamber portion 103 and hollow shaft 104, to terminate at 140 in sealed slidable relation to a bushing 141 forming the side wall of a lower chamber 142 in a fluid housing 145 which is fixed to a flange 146 on the lower extremity of the basket shaft.

Within chamber portion 103 the shaft 130 carries a clutch member 150 having a ring of teeth 151 capable of meshing with teeth 152 of a companion clutch member 153 carried by a rotary plunger 154. The plunger 154 carries also an external ring gear 155 having teeth always slidably in mesh with teeth of an internal ring gear 156 on the side wall of chamber 103, so that the plunger must always rotate with chamber portion 103 and the basket 1 but is able to reciprocate axially with respect thereto while so rotating. The plunger has a cylindrical tail portion 157 always fitting slidably against a cylindrical wall 158 of chamber portion 103, and the body of the plunger is mounted about shaft 130 on a bushing 159 so that the space within chamber portion 103 is divided by the plunger into lower and upper fluid pressure chambers 160 and 161, respectively. The body of the plunger can move axially on bushing 159 relative to shaft 130, between a forward position of engagement of the clutch members 150 and 153 and a backward position of their disengagement limited by the location of a bearing unit 162 fixed on shaft 130 in pressure chamber 160. In moving axially forward or backward beyond these relative positions the plunger must carry shaft 130 and the feed member axially with itself relative to the basket 1 and chamber portion 103.

An axial fluid passageway 163 inside shaft 130 interconnects the upper pressure chamber 161 and chamber 142 in fluid housing 145. An annular space 164 between shafts 105 and 130 forms a fluid passageway interconnecting the lower pressure chamber 160 and an annular chamber 147 in fluid housing 145 around the lower end of the feed member shaft. Pressure fluid lines 165 and 166 extend respectively from the chambers 142 and 147 to different ports of a pressure fluid control valve 167 which has a rotatable valve body 168 for connecting these lines alternately with a supply line 169 for fluid under pressure and with a vent line 170 through which the fluid pressure in lines 165 and 166 may be released.

In the operation of this second embodiment, the centrifugal basket 1 is rotated continuously at the desired speed by the driving action applied to shaft 104, and the valve body 168 is moved regularly to connect the pressure fluid supply line 169 alternately with lines 166 and 165. Upon thus admitting pressure fluid to line 166, line 165 being then vented, pressure is applied in chamber 160 to move plunger 154 axially forward, and at the end of the forward stroke the pressure is switched to line 165, while 166 is vented, so as to apply pressure in chamber 161 and thus move the plunger backward to its original position. In beginning the forward stroke clutch member 153 on the plunger engages companion clutch member 150 on shaft 130; and after this the further forward movement proceeds with shaft 130 and the feed member 120 being rotated through these clutch members at substantially the same speed as the basket while they are being thrust axially forward relative to the basket by the fluid pressure in chamber 160. In this relative movement, the outwardly sloping longitudinal surfaces 123 and 124 of the arms 121 advance solids spinning in the basket toward the open end of the basket by pushing them a step forward along wall 2, rather than by continuously exerting an axial thrust component through continuous rotation relative to the basket and the charge.

The reversal of pressure from chamber 160 to chamber 161 at the end of the forward stroke causes the plunger 154 at first to disengage clutch member 153 from member 150, and then the plunger abuts against bearing unit 162 on shaft 130 so that the further backward movement pulls shaft 130 and the feed member backward with respect to the basket. During this backward movement shaft 130 and clutch member 150 are able to rotate freely, and, by reason of the large helic angle with which the arms 121 engage solids spinning in the basket, the resistance imposed by these solids against sides of the backwardly moving arms causes the arms to turn in unscrewing relation to the charge as they are pulled backward.

It thus will be seen that the machine of Fig. 7 embodies in a relatively simple manner the invention disclosed in said copending U. S. Patent No. 2,462,098, by making use of a multiplicity of helical arms extending through the length of the charge at a large helic angle so that the charge itself may serve as an agency for producing rotation of the feed member in unscrewing relation to the charge upon backward movement of the feed member.

A further novel aspect of this second embodiment is that the tapered shape of the helical arms effectuates movement of solids along the basket on forward strokes of the feed member by a sort of wedging or shoving action in which not only leading sides but also other surface portions of the arms may take part.

As shown in Fig. 7 and more clearly in Fig. 9, the slidably meshing ring gears 155 and 156 are cut with axial teeth which require the forward relative motions of the feed member to be axial without any attendant angular component. To the extent of any helical slope of the feed member arms, this may involve an unnecessary degree of sliding of the forwardly moving arms relative to the solids they engage. That sliding can be overcome by the use of helical ring gears 155a and 156a as shown in Fig. 10, which cause the feed member to turn relative to the charge as it is being moved axially forward under the pressure in chamber 160, in such manner that the arm surfaces 123 must move forward at right angles to the respective bodies of solids which they engage.

In the operation of this embodiment, the charging of material into the continuously rotating basket, the washing of the spinning solids, the washing of the basket foramina and the separate collection of the solids and liquids spun from the basket may take place substantially as already described in connection with the first embodiment.

It is to be understood that a feed member as shown in Figs. 1 to 6, or other structures embodying features of the present invention, may be used in combination with any suitable embodiment of the invention of said copending application wherever the special advantages available from the latter may be desired. It also will be understood that the new combinations and features of construction disclosed and claimed as the present invention are not limited to the illustrative forms or arrangements hereinabove described and shown in the drawings except as proper construction of the claims may require.

I claim:

1. A method of separating liquid and solids components of a material which comprises rotating continuously at high speed a centrifugal basket having an annular foraminous side wall closed at one end to receive the material and open at the other end for the discharge of solids, rotating in the same direction as the basket a feed member within it having shallow helical arms spaced apart circularly about said wall and extending along and helically adjacent thereto between said ends, charging the material continuously into the basket so as to maintain an annular body of solids therein at a depth covering said arms, advancing such solids continuously toward said open end by moving said arms relative to and in a condition of submersion within said body of solids, while so advancing the solids applying a washing fluid to the inner surface of said body of solids where it covers said arms, and centrifugally expelling liquid from the advancing solids through said side wall.

2. A method as described in claim 1, and while effecting the separation as described, delivering washing fluid through the rotating arms from locations at the outer surface of said body of solids directly to the inner face of said side wall to keep the wall foramina clean.

3. A continuous centrifugal machine for separating liquid from solids, comprising a centrifugal basket having an annular foraminous side wall open at one end, and a coaxial rotary feed member within the basket having a multiplicity of circularly spaced helical arms extending along and immediately adjacent to said wall in fixed relation to one another, said arms respectively having longitudinal solids-engaging surfaces spanning substantially the entire length of the foraminous area of said wall and extending therealong at a helic angle of at least 20° in position to engage laterally charge material next to said wall, at least one of said arms having therealong an internal channelway for washing fluid opening at and along the inner surface of said side wall for delivering such fluid directly to the basket foramina at the outer periphery of a charge in the basket, and means for rotating said basket and said feed member in the same direction on their common axis and for moving the feed member relative to the basket on said axis so as to discharge solids continuously from said open end of the basket.

4. A machine as described in claim 3, said arms comprising helical pipe sections closed at their ends to provide channelways and having perforations along their outsides constituting outlets for the washing fluid.

5. A machine as described in claim 3, said arms comprising channel elements open along their outer sides at the inner surface of the adjacent basket wall and tapering radially outward in the direction of their length from relatively deep and wide bases at one end to relatively small extremities at the open end of said wall.

6. A machine as described in claim 5, said channel elements each comprising a central helical ridge defining its inner border from its base substantially to its extremity and solids-engaging sides extending along the ridge and sloping oppositely from the ridge to the adjacent basket side wall.

7. A machine as described in claim 6, the longitudinal axes of said channel elements extending along said side wall at a helic angle exceeding 45°.

8. A continuous centrifugal machine for separating liquid from solids, comprising a centrifugal basket having an annular foraminous side wall open at one end and closed at the other, a coaxial rotary feed member within the basket having a multiplicity of circularly spaced helical arms extending along and immediately adjacent to said wall between its ends and in fixed relatoin to one another, a common wheel carrying said arms near said closed end, each arm having a longitudinal solids-engaging surface lying next to and extending over substantially the entire length of the foraminous area of said wall at a helic angle of at least 20°, continuously rotatable shafts respectively connected with and extending coaxially away from the basket and said wheel at said closed end, said shafts being rotatable in the same direction and relatively movable on their common axis, the open end and interior of the basket being centrally unobstructed to expose its contents and accommodate stationary piping means extended thereinto, the wheel having structures facing said open end to receive incoming charge material and deliver it about said wall near said closed end, a plurality of said arms having therealong respective internal longitudinal channelways for washing fluid which open along and at the inner surface of said wall for delivering such fluid directly to the basket foramina at the outer periphery of a charge in the basket, said wheel carrying a receptacle for such fluid having radial passageways to the respective channelways, and means connected with said shafts respectively for rotating said basket and said feed member in the same direction on their common axis and for moving the feed member relative to the basket on said axis so as to discharge solids continuously from said open end of the basket.

References Cited in the file of this patent

UNITED STATES PATENTS

| | | |
|---|---|---|
| 417,799 | Waldbaur | Dec. 24, 1889 |
| 801,055 | Alderequia | Oct. 3, 1905 |
| 1,253,428 | Salcines | Jan. 15, 1918 |
| 1,749,368 | Behr | Mar. 4, 1930 |
| 2,047,840 | Twomley | July 14, 1936 |
| 2,114,778 | Fillinger | Apr. 19, 1938 |
| 2,164,818 | Heyer | July 4, 1939 |
| 2,292,990 | Chatain | Aug. 11, 1942 |
| 2,326,071 | Schutte | Aug. 3, 1943 |
| 2,462,098 | Hertrich | Feb. 22, 1949 |
| 2,499,457 | Buquoi et al. | Mar. 7, 1950 |

FOREIGN PATENTS

| | | |
|---|---|---|
| 15,643 | Great Britain | of 1910 |
| 19,745 | Great Britain | of 1913 |
| 115,909 | Great Britain | May 27, 1918 |